UNITED STATES PATENT OFFICE.

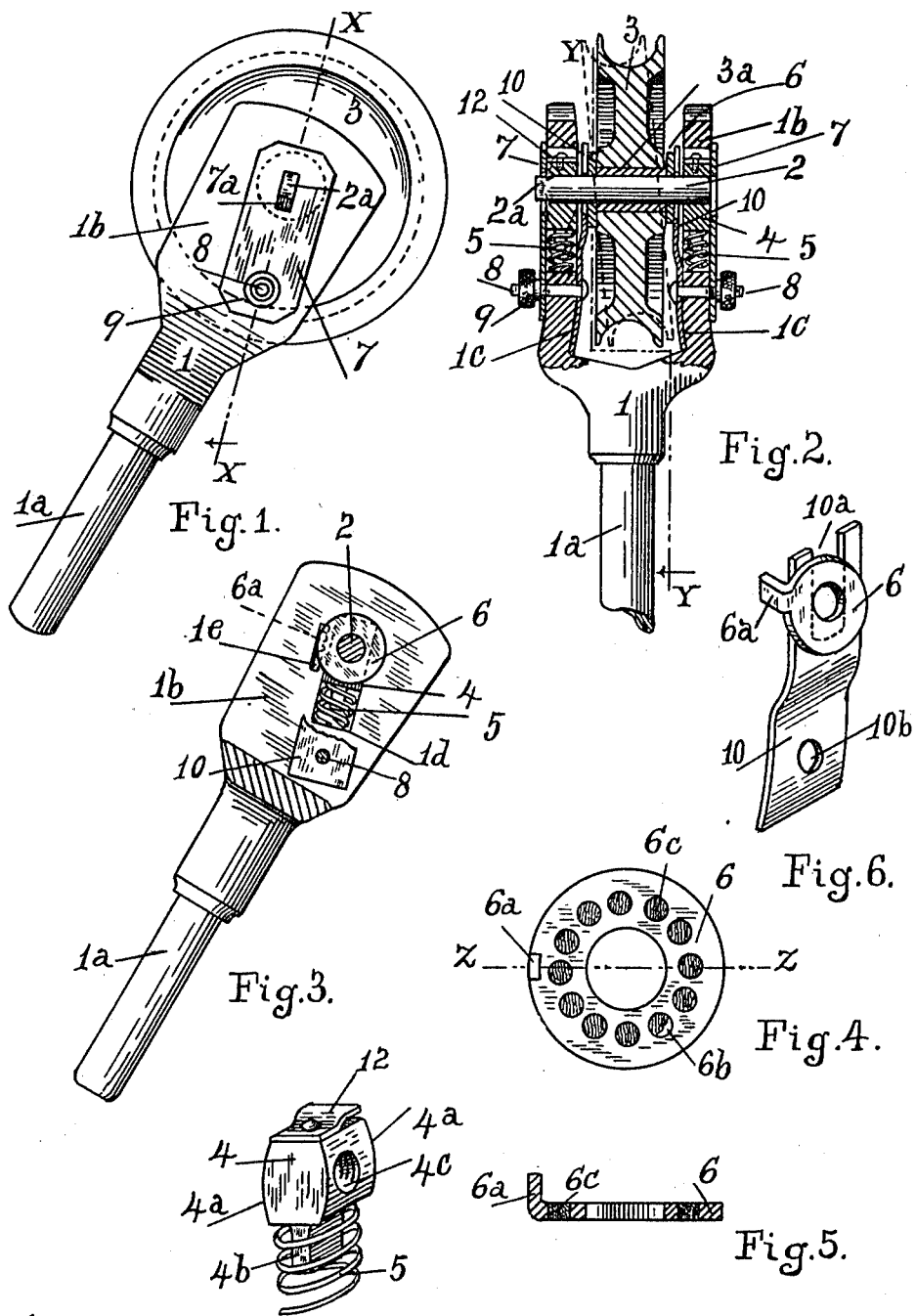

CLARENCE A. GOUTY, OF SPRINGFIELD, ILLINOIS, ASSIGNOR OF ONE-HALF TO HENRY F. LONG, OF SPRINGFIELD, ILLINOIS.

TROLLEY.

1,001,636.      Specification of Letters Patent.      Patented Aug. 29, 1911.

Application filed June 23, 1910. Serial No. 568,469.

*To all whom it may concern:*

Be it known that I, CLARENCE A. GOUTY, a citizen of the United States, residing at Springfield, in the county of Sangamon and State of Illinois, have invented a new and useful Trolley, of which the following is a specification.

This invention relates to trolleys such as are used in operating electric cars.

The purposes of the invention are: to provide means for mounting the trolley wheel on the harp so that the wheel may have slight transversely oscillative movement between the forks of the harp; to provide means to yieldingly support the trolley-shaft and keep it from turning; to provide means to prevent lateral displacement of the trolley shaft supports; to provide simple and effective means for connecting with the trolley harp the means for preventing displacement of the trolley-shaft supports; and to provide lubricating washers contacting with the ends of the hub of the trolley wheel.

The invention is illustrated in the annexed drawing to which reference is hereby made and is hereinafter particularly described and finally recited in the claims.

Figure 1 is a side elevation of the trolley; Fig. 2 is an oblique section on the line X. X. of Fig. 1; Fig. 3 is a vertical section through the trolley on the zig-zag line Y. Y. of Fig. 2; Fig. 4 is an enlarged plan of one of the contact washers; Fig. 5 is a vertical section on the line Z. Z. of Fig. 4; Fig. 6 is an isometric view of one of the contact springs and one of the contact washers in operative relation to each other; and Fig. 7 is an enlarged isometric view of one of the blocks supporting the trolley shaft.

Similar reference numerals and characters designate like parts in the several views.

The trolley harp 1 has a cylindrical stem $1^a$, adapted to turn in any suitable support, and fork-members $1^b$ supporting the trolley shaft 2, so that the trolley wheel 3 will rotate between the fork-members $1^b$. The inner walls of the fork-members $1^b$ are inclined or under-cut as at $1^c$, in order that when the trolley wheel oscillates transversely, as indicated by dotted lines in Fig. 2, the rim of the wheel will not rub on the sides of the fork-members. The fork-members $1^b$ have rectangular openings $1^d$ accommodating the blocks 4 and the springs 5, and rectangular openings $1^e$ accommodating the lugs $6^a$ of the washers 6. Each of the blocks 4 has curved faces $4^a$ adapted for rocking contact of the faces of the block with the inner face of the guard plate 7 on one side of the block and the inner face of the contact spring 10 on the other side of the block, so that the block may have limited lateral oscillating movement between the contact spring and the guard-plate. Each block 4 also has a downwardly extending finger $4^b$. Elliptical coiled springs 5 fit within the openings $1^d$ and surround the fingers $4^b$ of the blocks 4 and normally act to keep the blocks in a vertical position. Each of the contact springs 10 is shaped to conform to the inner wall of the harp-members and has a lengthwise slot $10^a$ accommodating the cylindrical part of the shaft 2 so that the shaft will slide upward and downward in the slot, and a hole $10^b$ accommodating a bolt 8 which connects the contact spring and the guard plate 7 with the fork-member $1^b$.

Bolts 8 extend through the contact springs 10, the fork-members $1^b$ and the guard plates 7. Milled nuts 9 fitting on the bolts 8, securely connect the parts together in such position that the cylindrical part of the shaft 2 will extend through the fork $10^a$ of one of the springs 10 and through the holes $4^c$ of the blocks 4; and the flattened part $2^a$ of the shaft will occupy the opening $7^a$ of one guard plate 7 and will keep the shaft from turning. Flat springs 12 maintain electrical connection between the blocks 4 and the harp-members $1^b$ and prevent rattling of the parts. Washers 6 fit around the shaft 2 and respectively contact with the ends of the hub of the trolley wheel and with the contact springs 10, and the springs hold the washers in contact with the hub and the lugs $6^a$ fitting in the openings $1^e$ prevent turning of the washers. Pockets $6^b$ in the washers 6 are filled with graphite $6^c$, or equivalent lubricating material, and the ends of the hub of the trolley wheel rotate in contact with the lubricating fillings of the pockets.

In practical use lateral pressure on the trolley wheel such as is caused by the contact of the wheel with the trolley wire when rounding a curve, compresses the spring 5 supporting the block 4 on which is mounted that end of the shaft 2, which is inside of the curve, so that the wheel inclines laterally, as indicated by dotted lines in Fig. 2, to conform to the curve and thereby avoids running off the wire. When the curve has been passed the spring acts to raise the block to restore the trolley wheel to its original position.

In practice it is found that the lateral oscillations of the trolley wheel are so sudden that there is great danger of displacement of the blocks 4 and the springs 5. I therefore provide the contact springs 10 on one side of the blocks and the guard-plates 7 on the other side of the blocks, said guard plates and contact springs being connected with the harp-members so that the blocks may have limited oscillative movement between the guard-plates and the springs, and the guard-plates and springs will prevent lateral displacement of the blocks.

To avoid unnecessary complication in construction the parts are so constructed and arranged that a single bolt 8 connects one spring and one guard plate with each member $1^b$ of the harp; and in addition to serving as guard plates to prevent lateral displacement of the blocks 4 and springs 5, the plates 7 serve to prevent turning of the trolley shaft but permit upward and downward movement thereof.

Having fully described my invention what I claim as new and desire to secure by Letters Patent is:

1. In a trolley, the combination of a harp having members provided with transverse openings adapted to accommodate movable blocks; shaft-supporting blocks mounted to slide and oscillate in the openings in said harp-members; springs supporting said blocks respectively; a shaft mounted in said blocks and having a flat part; and guard plates connected with said harp-members and adapted to prevent excessive outward movement of said blocks, and having slots adapted to accommodate the flat part of said shaft to prevent rotation of the shaft.

2. In a trolley, the combination of a harp having members provided with transverse openings adapted to accommodate movable blocks; shaft-supporting blocks mounted to slide and oscillate in the openings in said harp-members; springs supporting said blocks respectively; a non-rotatable shaft mounted in said blocks; a trolley wheel rotatable on said shaft; guard-plates connected with said harp-members respectively and adapted to limit outward movement of said shaft-supporting blocks; and contact springs connected with said harp-members respectively and adapted to limit inward movement of said shaft-supporting blocks, also adapted to maintain electrical connection between said trolley wheel and said harp.

3. In a trolley, the combination of a harp having members provided with transverse openings adapted to accommodate movable blocks; shaft-supporting blocks mounted to slide and oscillate in the openings in said harp-members; a shaft mounted in said blocks; a wheel mounted to rotate on said shaft; a contact spring on the inside of each harp-member, limiting inward movement of the block in that harp-member, and maintaining electrical connection between the wheel and the harp; a guard plate on the outside of each harp-member, limiting outward movement of said block in that harp-member; and bolts respectively connecting one contact spring and one guard plate with each harp-member.

4. In a trolley, the combination of a harp having members provided with transverse openings adapted to accommodate movable blocks; a contact spring on the inside of each harp-member; a guard-plate on the outside of each harp-member; shaft-supporting blocks between said guard plates and contact springs; springs supporting said movable blocks; a shaft mounted in said blocks; a trolley wheel rotatable on said shaft; and washers on said shaft engaged by said contact spring and engaging the ends of the hub of said wheel.

In witness whereof I have hereunto signed my name at Springfield Illinois this 2d day of June 1910.

CLARENCE A. GOUTY.

Witnesses:
PEARL COLEMAN,
W. S. TROXELL.

---

Copies of this patent may be obtained for five cents each, by addressing the "Commissioner of Patents, Washington, D. C."